United States Patent [19]

Akamatsu et al.

[11] Patent Number: 5,352,536
[45] Date of Patent: Oct. 4, 1994

[54] MULTILAYERED STRUCTURAL BODY

[75] Inventors: Masahiro Akamatsu; Osamu Tohya; Tohru Yukumoto, all of Himeji, Japan

[73] Assignee: Idemitsu Petrochemical Co., Ltd., Japan

[21] Appl. No.: 49,561

[22] Filed: Apr. 19, 1993

[30] Foreign Application Priority Data

Apr. 21, 1992 [JP] Japan .................. 4-126683

[51] Int. Cl.$^5$ .................. B32B 27/08; B32B 27/30; B32B 33/00
[52] U.S. Cl. .................. 428/522; 428/500; 428/520
[58] Field of Search ............... 428/509, 500, 522, 520

[56] References Cited

U.S. PATENT DOCUMENTS 5,084,352  1/1992  Percec et al. .................. 428/412

FOREIGN PATENT DOCUMENTS 0363895  4/1990  European Pat. Off. .
0390113 10/1990  European Pat. Off. .
0474159  3/1992  European Pat. Off. .
2302933 10/1976  France .

*Primary Examiner*—Edith Buffalow
*Attorney, Agent, or Firm*—Wenderoth, Lind & Ponack

[57] ABSTRACT

Disclosed is a laminated resin sheet consisting of (a) at least one layer of an ethylene-vinyl alcohol copolymeric resin (EVOH resin), (b) at least one layer of a hot-melt adhesive resin and (c) at least one layer of a polystyrene-based resin, the layer (b) being interposed between the layers (a) and (c) to serve to adhesively bond them together. The laminated sheet has excellent moldability only when the EVOH resin has a thermal characteristic specified in terms of the integrated value of the peak areas in a diagram obtained by the DSC (differential scanning calorimetry) measurement in the course of temperature elevation.

4 Claims, 1 Drawing Sheet

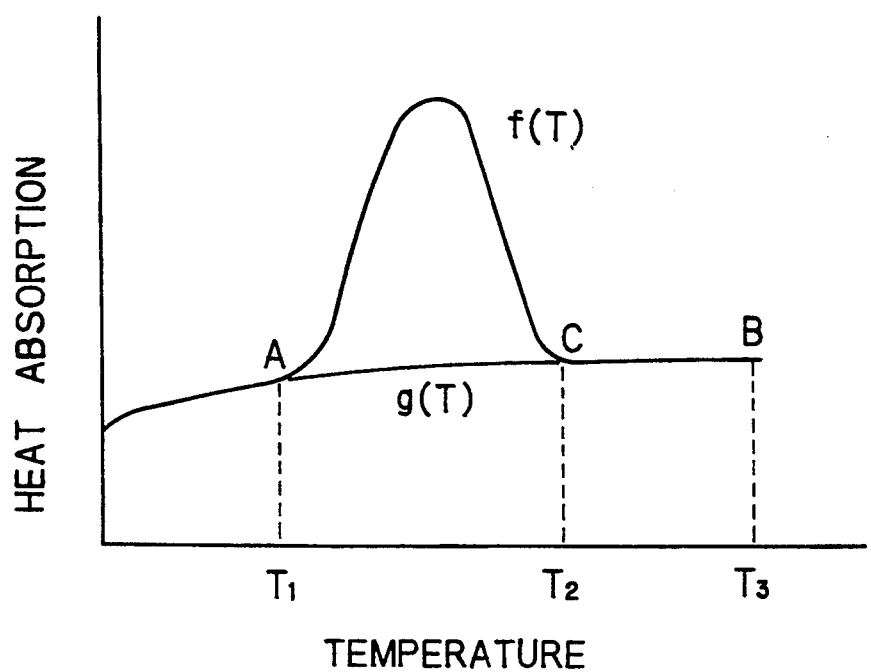
FIGURE

MULTILAYERED STRUCTURAL BODY

BACKGROUND OF THE INVENTION

The present invention relates to a multilayered structural body and a method for the preparation of a structural body such as a vessel having a multilayered wall. More particularly, the invention relates to a multilayered structural body imparted with low permeability to gases utilizing a styrene-based resin retaining excellent moldability of such resins in general and method for the preparation of a vessel having such a multilayered wall.

As is known, plastic resins are widely used as a wrapping material by virtue of their excellent properties such as absence of hygenic problems, good protection for the wrapped material, adaptability to shaping into desired forms, handiness, low costs and capability of giving various kinds of light-weight or see-through vessels or bags. In particular, plastic films have an extremely great and rapidly growing demand as a low-cost wrapping material of foods capable of excellently keeping the freshness of the foods wrapped therewith.

Polystyrene-based resins as a class of thermoplastic resins have excellent moldability at an elevated temperature and high rigidity of shaped articles thereof so that they are widely used as a wrapping material of foods. On the other hand, copolymeric resins consisting of the moieties of ethylene and vinyl alcohol have low permeability to gases so that they are also widely used as a wrapping material of foods, especially, when the foods are desired to be protected from the influences of the atmospheric oxygen or moisture.

A multilayered laminate consisting of layers of a polystyrene and an ethylene-vinyl alcohol copolymer, referred to as an EVOH copolymer hereinafter, is a well known material and various types have been proposed thereof. A problem in the application of such a multilayered laminate is that, since the optimum molding temperature differs between a polystyrene-based resin and an ethylene-vinyl alcohol copolymer as a matter of course, such a laminate cannot be molded into a structural body such as a vessel by molding at a relatively low molding temperature which might be suitable for molding of a polystyrene-based resin sheet per se.

Japanese Patent Kokai 52-112120 discloses a five-layered laminate consisting of two layers of a polystyrene-based resin and a layer of an EVOH copolymer sandwiched between the polystyrene resin layers with a layer of an adhesive resin intervening between the layer of the EVOH copolymer and each of the polystyrene resin layers. No consideration, however, is made in this disclosure on the moldability of the laminate relative to the constitution of the laminated sheets.

SUMMARY OF THE INVENTION

The present invention accordingly has an object, in consideration of the above described situations relative to a laminated resin sheet, to provide a multilayered structural body or laminated sheet consisting of layers of a polystyrene-based resin and an EVOH copolymer having excellent moldability inherent in polystyrene-based resins and very low permeability to gases inherent in EVOH copolymeric resins as well as to provide a method for shaping a vessel with high efficiency and at low costs by molding the above mentioned laminated sheet.

Thus, the multilayered structural body of the invention comprises:

(a) at least one layer of a sheet of an ethylene-vinyl alcohol copolymeric resin;
(b) at least one layer of a hot-melt adhesive resin; and
(c) at least one layer of a sheet of a polystyrene-based resin, the layer (b) of the adhesive resin being interposed between the layer (a) and the layer (c) and the ethylene-vinyl alcohol copolymeric resin having such a thermal characteristic that, when the resin is subjected to a measurement of DSC (differential scanning calorimetry), the fraction of the integrated value of the area of the peak or peaks in the DSC diagram at 160° C. or below taken by increasing the temperature is at least 30% of the integrated value for all of the peaks over the whole temperature range up to melting of the resin.

The above defined laminated sheet can be easily shaped by molding under heating when the surface temperature $T_F$, which is 110° C. or higher, of the laminated sheet satisfies simultaneously the relationships given by the two inqualities described later.

BRIEF DESCRIPTION OF THE DRAWING

The figure is for the illustration of the integrated value of a DSC peak area.

DETAILED DESCRIPTION OF THE PREFERRED EMBODIMENTS

As is described above, the multilayered structural body or laminated sheet of the invention, which has a thickness of about 0.1 to about 2.0 mm, comprises each at least one layer of (a) a sheet of an EVOH copolymer, (b) a hot-melt adhesive resin and (c) a sheet of a polystyrene-based resin, of which the layer (b) is interposed between the layer (a) and the layer (c). It is essential that the EVOH resin has such a thermal characteristic that, when the resin is subjected to a measurement of DSC (differential scanning calorimetry), the fraction of the integrated value of the peak area or areas in the DSC diagram at 160° C. or below taken by increasing the temperature is at least 30% of the integrated value for all of the peaks over the whole temperature range up to melting of the resin. When this requirement is satisfied, the laminated sheet can be easily shaped by molding into a desired form at a temperature of 160° C. or below. Preferably, when the integrated value of the DSC peak areas up to 150° C. is 20% or larger in addition to the above mentioned requirement for the temperature range up to 160° C., the laminated sheet can be easily shaped by molding into a desired form at a temperature of 150° C. or below. More preferably, when the integrated value of the DSC peak areas up to 140° C. is 15% or larger in addition to the above mentioned requirements for the respective temperature ranges, the laminated sheet can be easily shaped by molding into a desired form at a temperature of 140° C. or below. Most preferably, when the integrated value of the DSC peak areas up to 120° C. is 5% or larger in addition to the above mentioned requirements for the respective temperature ranges, the laminated sheet can be easily shaped by molding into a desired form at a temperature of 120° C. or below. When these requirements are not satisfied, the laminated sheet prepared by using such an EVOH resin sheet is disadvantageous because the vessels shaped therefrom would be uneven or cracks are formed therein. When these requirements are satisfied, on the other hand, the laminated sheet can be shaped into a desired form in a short one-shot cycle time and at a decreased cost for molding.

The figure of the accompanying drawing serves to define the terms used in the above. Namely, the integrated value of a peak area is given by the area surrounded by the curve g(T), which is the base line running from the point A (temperature $T_1$) to the point B (temperature $T_3$), and the curve f(T), which is the peak line starting to rise at the point A corresponding to a temperature $T_1$ and falling back to the base line at the point C corresponding to a temperature $T_2$, and the temperature of the peak is defined to be the temperature when the peak line f(T) has returned to the base line g(T) at the point C given by $T_2$ in the figure. The integrated value A of the peak area is given by the equation:

$$A = \int_{T_1}^{T_2} [f(T) - g(T)]dT,$$

making reference to the figure.

The EVOH resin to form the layer (a) should preferably have a melt index (MI) of 10 g/10 minutes or smaller at 190° C. When a sheet of an EVOH resin having a melt index value to exceed the above-mentioned upper limit, unevenness would be caused in the lamination of the sheets, in particular, in the transverse direction of a continuous-length sheet. Further, it is preferable to use an EVOH resin of which the content of the ethylene moiety is in the range from 20 to 35% and the melting point does not exceed 185° C. When the content of the ethylene moiety exceeds the above mentioned upper limit, the layer of such an EVOH resin would work poorly as a barrier against gas permeation and, when the melting point of the resin is too high, cracks may eventually be formed in the shaped articles prepared by molding the multilayered structural body. It is preferable that the thickness of the layer or total thickness of the layers (a) does not exceed 20% or, more preferably, 10% of the overall thickness of the multilayered structural body in order to obtain good moldability thereof. It is of course, however, that the thickness of the layer (a) of the EVOH resin should have a thickness larger than a certain lower limit in order that the inventive multilayered structural body or laminated sheet may serve as a gas barrier against atmospheric oxygen or moisture. In this regard, the thickness of the layer (a) or total thickness of the layers (a) should be at least 5 μm.

The hot-melt adhesive resin forming the layer (b) should be selected from those having such a thermal characteristic that the end point temperature of the peak appears in the DSC diagram taken in the course of temperature elevation does not exceed 130° C. or, preferably, does not exceed 100° C. When this temperature is too high, the adhesive layer would be subject to uneven stretching in molding.

When the inventive multilayered structural body or laminated sheet is to be prepared by extrusion molding, in particular, the hot-melt adhesive resin for the layer (b) should preferably have a melt index not exceeding 20 g/10 minutes at 190° C. as measured according to the procedure specified in JIS K6730. When the melt index value of the adhesive resin is too high, unevenness is caused as a trend in the distribution or flow of the adhesive layer. On the other hand, the adhesive resin should desirably have a melting point of 70° C. or higher. This is because, since the multilayered structural body or laminated sheet of the invention is sometimes shaped into a vessel or container which is used in wrapping works of hot food at 70° C. or even higher, delamination is unavoidable in the walls of the vessel or container when the melting point of the adhesive resin is too low. Examples of suitable hot-melt adhesive resins include unmodified or modified copolymeric resins of ethylene and vinyl acetate and unmodified or modified copolymers of α-olefins. The layer (b) or each of the layers (b) of the adhesive resin should preferably have a thickness in the range from 5 to 50 μm. In addition, in order to exhibit good adhesive bonding strength between the layers (a) and (c), it is also desirable that the total thickness of the layer or layers (a) of the EVOH copolymeric resin and the layer or layers (b) of the adhesive resin does not exceed 30% of the overall thickness of the multilayered structural body as a whole.

The polystyrene-based resin forming the layer (c) of the inventive multilayered structural body is not particularly limitative and can be selected from various kinds of resins including general-purpose polystyrene resins, high-impact polystyrene resins, special-grade transparent polystyrene-based resins, syndiotactic polystyrene resins and acid-modified and syndiotactic polystyrene resins as well as polymer blends of these resins with a styrene-based elastomer depending on the rigidity, impact strength, heat resistance, transparency and other characteristics desired for the articles shaped from the inventive multilayered structural body.

As the simplest constitution of the multilayered structure, the multilayered structural body of the invention can consist of three layers including each one of the layers (a) and (c) laminated by adhesive bonding with a layer (b) of the adhesive resin interposed therebetween although it is optional that one or more layers (d) of a different resin are further laminated with the inventive multilayered structural body. Preferably, the multilayered structural body of the invention has a five-layered structure consisting of two of the layer (c) of the polystyrene-based resin sandwiching a layer (a) of the EVOH resin with two layers (b) of the adhesive resin each between the layer (a) and one of the layers (c).

The multilayered structural body of the invention can be easily shaped by hot molding into a desired form such as a vessel or container. It is preferable to perform the hot molding work of the inventive multilayered structural body when the surface temperature of the body under heating is $T_F$ (°C.) which simultaneously satisfies the two inequalities:

$$(0.563T_F - 60.3)/100 \leq$$

$$\int_{T_1}^{T_F} [f(T) - g(T)]dT / \int_{T_1}^{T_2} [f(T) - g(T)]dT,$$

and $$\int_{T_F-10}^{T_F} [f(T) - g(T)]dT / \int_{T_1}^{T_2} [f(T) - g(T)]dT \leq 0.5,$$

in which $T_F$ is a temperature of 110° C. or higher. When the molding temperature $T_F$ does not simultaneously satisfy both of these inequalities, disadvantages are caused that, for example, cracks are formed in the layer (a) or the layer (a) is unevenly stretched resulting in a decrease in the performance of the shaped article as a gas barrier if not to mention poor appearance of the molded products. Various kinds of conventional hot-molding methods are applicable here including vacuum forming, pressure forming and vacuum-pressure forming without or with attachment of a plug assist using a heating means such as a hot-plate heater for direct heating and an infrared radiation heater for indirect heating. The multilayered structural body of the invention can be thus shaped at a low fraction of defective products into vessels or containers having walls of a multilayered structure capable of working as a very high barrier against oxygen so as to be suitable for preservation of foods as compared with a vessel or container molded from a monolayered sheet of a polystyrene-based resin. In the following, examples are given to illustrate the inventive multilayered structural body as well as a molding process thereof in more detail, which, however, never limit the scope of the invention in any way. The starting EVOH resins used in the following Experiments were characterized in terms of the DSC behavior and the laminated sheets prepared in the following Experiments were evaluated for the condition after molding and moldability each according to the following criteria for rating.

(1) DSC characteristics of EVOH resins

Rating 1: Integrated value of DSC peaks up to 160° C. is smaller than 30% of the overall integrated value.

Rating 2: Integrated value of DSC peaks up to 160° C. is at least 30% of the overall integrated value.

Rating 3: Integrated value of DSC peaks up to 150° C. is at least 20% of the overall integrated value.

Rating 4: Integrated value of DSC peaks up to 140° C. is at least 15% of the overall integrated value.

Rating 5: Integrated value of DSC peaks up to 130° C. is at least 10% of the overall integrated value.

Rating 6: Integrated value of DSC peaks up to 120° C. is at least 5% of the overall integrated value.

(2) Condition after molding

Rating 10: absolutely no unevenness in the barrier layer

Rating 9: very slight, barely detectable unevenness in the barrier layer

Rating 8: slight unevenness in the barrier layer

Rating 7: faint streaks found in the barrier layer

Rating 6: streaks found in the barrier layer

Rating 5: creases found in the barrier layer

Rating 4: cracks found in the barrier layer

Rating 3: large numbers of cracks found in the barrier layer

Rating 2: very poor condition of molding

Rating 1: impossible molding (3) Moldability

Rating 10: Condition after molding rated 10 can be obtained within a temperature range over at least 40° C. not exceeding 160° C.

Rating 9: Condition after molding rated 10 can be obtained within a temperature range over at least 20° C. not exceeding 160° C.

Rating 8: Condition after molding rated 10 can be obtained within a temperature range over at least 10° C. not exceeding 160° C.

Rating 7: Condition after molding rated 10 can be obtained within a temperature range not exceeding 150° C.

Rating 6: Condition after molding rated 10 can be obtained.

Rating 5: Condition after molding rated 7 can be obtained within a temperature range not exceeding 150° C.

Rating 4: Condition after molding rated 5 can be obtained.

Rating 3: No molding can be performed at 160° C. or below without crack formation.

Rating 2: Molding condition is very poor irrespective of temperature.

Rating 1: No molding is possible.

The resins used in the Examples and Comparative Examples are characterized in the following.

PS-1: High-impact polystyrene having a melt index of 2 g/10 minutes (Idemitsu Styrol EPS-1, a product by Idemitsu Petrochemical Co.)

PS-2: General-purpose polystyrene having a melt index of 4 g/10 minutes (Idemitsu Styrol HH-30E, a product by the same company, supra)

PS-3: Acid-modified polystyrene having a melt index of 0.7 g/10 minutes (Idemitsu Moamax UH 830, a product by the same company, supra)

PS-4: Special-grade styrene-based transparent resin having a melt index of 8.0 g/10 minutes (KR-03, a product by Philips Co.)

SIS: Styrene-isoprene copolymeric elastomer having a melt index of 9 g/10 minutes (Califlex TR 1107, a product by Shell Chemical Co.)

AD-1: Ethylene-vinyl acetate copolymer having a melt index of 2 g/10 minutes and melting point of 98° C. (Melthene M-5420, a product by Tosoh Co.)

AD-2: Ethylene-vinyl acetate copolymer having a melt index of 7.5 g/10 minutes and melting point of 90° C. (Melthene M-5321, a product by Tosoh Co.)

AD-3: Ethylene-vinyl acetate copolymer having a melt index of 30 g/10 minutes and melting point of 66° C. (Ultrathene 750, a product by Tosoh Co.)

EVOH-1: Ethylene-vinyl alcohol copolymer having a melt index of 2.8 g/10 minutes at 190° C. (Eval EP K-102B, a product by Kuraray Co.)

EVOH-2: Ethylene-vinyl alcohol copolymer having a melt index of 5.5 g/10 minutes at 190° C. (Eval EP K-105 B, a product by Kuraray Co.)

EVOH-3: Ethylene-vinyl alcohol copolymer of 47% by moles of ethylene moiety content having a melt index of 6.4 g/10 minutes at 190° C. and melting point of 160° C. (Eval EP G-156B, a product by Kuraray Co.)

EVOH-4: Ethylene-vinyl alcohol copolymer of 47% by moles of ethylene moiety content having a melt index of 14 g/10 minutes at 190° C. and melting point of 160° C. (Eval EP G-110B, a product by Kuraray Co.)

EVOH-5: Ethylene-vinyl alcohol copolymer of 32% by moles of ethylene moiety content having a melt index of 1.8 g/10 minutes at 190° C. and melting point of 183° C. (Eval X-1, a product by Kuraray Co.)

EVOH-6: Ethylene-vinyl alcohol copolymer of 32% by moles of ethylene moiety content having a melt index of 0.6 g/10 minutes at 190° C. and melting point of 181° C. (Eval EP F-100B, a product by Kuraray Co.)

EVOH-7: Ethylene-vinyl alcohol copolymer having a melt index of 2.1 g/10 minutes at 190° C. (Eval EP T-102B, a product by Kuraray Co.)

EVOH-8: Ethylene-vinyl alcohol copolymer of 27% by moles of ethylene moiety content having a melt index of 3.0 g/10 minutes at 210° C. or 1.3 g/10 minutes at 200° C. and melting point of 191° C. (Eval EP L-101B, a product by Kuraray Co.)

EVOH-9: Ethylene-vinyl alcohol copolymer having a melt index of 3.0 g/10 minutes at 210° C. (Soanol AT 4403, a product by Nippon Synthetic Chemical Co.)

Table 1 below summarizes the results of the DSC measurements for the EVOH resins showing the % fractions of the integrated values up to the respectively indicated temperatures in the overall integrated value in the DSC diagrams as well as ratings of the resins in the DSC characteristics according to the above given criteria.

TABLE 1

| EVOH | Temperature | | | | | DSC evaluation |
|---|---|---|---|---|---|---|
|  | 160° C. | 150° C. | 140° C. | 130° C. | 120° C. |  |
| 1 | 32 | 10 | 2 | 0 | 0 | 2 |
| 2 | 100 | 46 | 19 | 5 | 0 | 4 |
| 3 | 100 | 99 | 40 | 17 | 4 | 5 |
| 4 | 100 | 98 | 40 | 18 | 4 | 5 |
| 5 | 41 | 30 | 24 | 15 | 7 | 6 |
| 6 | 18 | 7 | 2 | 0 | 0 | 1 |
| 7 | 26 | 12 | 9 | 4 | 1 | 1 |
| 8 | 7 | 0 | 0 | 0 | 0 | 1 |
| 9 | 88 | 33 | 14 | 6 | 1 | 3 |

EXPERIMENTS 1 TO 16

A five-layered laminated sheet having an overall thickness of 1.0 mm consisting of two outermost layers of a polystyrene-based (PS) resin sandwiching a core layer of an EVOH resin with a layer of an adhesive (AD) resin interposed between the core layer and each of the outermost layers by the co-extrusion method using extruder machines having screws of 60 mm, 50 mm and 50 mm diameters for the PS resins, AD resins and EVOH resins, respectively. The fraction of the thickness of each of the layers in the overall thickness was 45% for each of the PS layers, 3% for each of the AD layers and 4% for the EVOH layer.

The thus prepared laminated sheet was shaped into a vessel by using a hot-molding machine Model CM-6333 with a plug under the conditions of a sheet temperature of 120° to 190° C., clamping pressure of 5 kg/cm², sheet-drawing velocity of 3 meters per second, metal mold temperature of 30° C. and draw ratio of the vessel of 0.5 to evaluate the moldability of the respective sheets. The results obtained in Experiments No. 1 to No. 8, No. 9 to No. 13 and No. 14 to No. 16 are shown in Tables 2, 3 and 4, respectively. The "extrudability" rated "good" or "poor" in Table 3 are the results of the evaluation of the EVOH resins in terms of the melt index not exceeding and exceeding, respectively, 10 g/10 minutes at 190° C. The expressions of "good" and "poor" for the "moldability" in Tables 3 and 4 are given for the ratings of 6-9 and 5-1, respectively, for the laminated sheets. The expressions of "good" and "poor" for the "extrudability" in Table 4 show that the AD resin has a melt index not exceeding or exceeding, respectively, 20 g/10 minutes at 190° C. The expressions of "good" and "poor" for the "heat resistance" in Table 4 correspond to a melting point of the AD resins of at least 70° C. and lower than 70° C., respectively.

Although the PS resin used in all of these Experiments was PS-1 only, substantially the same results were obtained by replacing the PS-1 resin with the same amount of the PS-2, PS-3 or PS-4 resin and by compounding PS-1 resin with 10% by weight of the SIS elastomer.

TABLE 2

| Experiment No. | Polystyrene-based resin | EVOH resin | Adhesive resin | Molding temperature, °C. | Condition after molding | Moldability |
|---|---|---|---|---|---|---|
| 1 | PS-1 | 1 | AD-1 | ≧160 | 10-6 | 6 |
| 2 | PS-1 | 9 | AD-1 | ≧160 140–150 | 10-7 | 7 |
| 3 | PS-1 | 2 | AD-1 | 130–150 ≧160 | 10-9 | 9 |
| 4 | PS-1 | 3 | AD-1 | 130–140 ≧150 | 10-9 | 8 |
| 5 | PS-1 | 5 | AD-1 | ≧120 | 10 | 10 |
| 6 | PS-1 | 6 | AD-1 | 140–160 | 1-5 | 4 |
| 7 | PS-1 | 7 | AD-1 | 120–160 | 1-5 | 4 |
| 8 | PS-1 | 5 | AD-2 | 150–160 | 4-7 | 5 |

TABLE 3

| Experiment No. | Polystyrene-based resin | EVOH resin | Adhesive resin | Molding temperature, °C. | Extrudability | Condition after molding | Moldability |
|---|---|---|---|---|---|---|---|
| 9 | PS-1 | 3 | AD-1 | 130–140 >150 | good | 10-9 | 8 |
| 10 | PS-1 | 5 | AD-1 | ≧120 | good | 10 | 10 |
| 11 | PS-1 | 4 | AD-1 | 130–140 ≧150 | poor | 10-9 | 8 |
| 12 | PS-1 | 6 | AD-1 | 140–160 | good | 1-5 | 4 |
| 13 | PS-1 | 8 | AD-1 | 130–160 | good | 1 | 1 |

TABLE 4

| Experiment No. | Polystyrene based resin | EVOH resin | Adhesive resin | Molding temperature, °C. | Extrudability | Condition after molding | Moldability | Heat resistance |
|---|---|---|---|---|---|---|---|---|
| 14 | PS-1 | 3 | AD-1 | 130–140 ≧150 | good | 10-9 | 8 | good |
| 15 | PS-1 | 3 | AD-2 | 130–140 ≧150 | good | 10-9 | 8 | good |
| 16 | PS-1 | 3 | AD-3 | 130–140 ≧150 | poor | 10-9 | 8 | poor |

What is claimed is:

1. A multilayered structural body which comprises, as an integral body:
  (a) at least one layer of a sheet of an ethylene-vinyl alcohol copolymeric resin;
  (b) at least one layer of a hot-melt adhesive resin; and
  (c) at least one layer of a sheet of a polystyrene-based resin,
  the layer (b) of the adhesive resin being interposed between and adhesively bonding together the layer (a) and the layer (c) and the ethylene-vinyl alcohol copolymeric resin having a thermal characteristic such that, when the resin is subject to a measurement of DSC (differential scanning calorimetry), the fraction of the integrated value of the area of the peak or peaks in the DSC diagram at 160° C. or below taken by increasing the temperature is at least 30% of the integrated value of the area for all of the peaks over the whole temperature range up to melting point of the resin, and wherein the adhesive resin for the layer (b) has a thermal characteristic such that, when the resin is subjected to a measurement of DSC (differential scanning calorimetry), the DSC diagram taken by increasing the temperature does not have a peak ending at a temperature of 130° C. or higher.

2. The multilayered structural body as claimed in claim 1 which is a five-layered structural body consisting of:
(a) a layer of a sheet of an ethylene-vinyl alcohol copolymeric resin;
(b) two layers each of a hot-melt adhesive resin; and
(c) two layers each of a sheet of a polystyrene-based resin, each of the layers (b) of the adhesive resin being interposed between the layer (a) and one of the layers (c).

3. The multilayered structural body as claimed in claim 1 in which the hot-melt adhesive resin for the layer (b) has a melt index not exceeding 20 g/10 minutes at 190° C. and a melting point of 70° C. or higher.

4. The multilayered structural body as claimed in claim 1 in which the ethylene-vinyl alcohol copolymeric resin for the layer (a) has a melt index not exceeding 10 g/10 minutes at 190° C. and a melting point not exceeding 185° C. and the content of the ethylene moiety therein does not exceed 35% by moles.

* * * * *